US012683362B2

(12) United States Patent
Vasishta et al.

(10) Patent No.: US 12,683,362 B2
(45) Date of Patent: Jul. 14, 2026

(54) ION EMITTER SYSTEM

(71) Applicant: Hamilton Sundstrand Corporation, Charlotte, NC (US)

(72) Inventors: Sujan Jayasimha Vasishta, Bangalore (IN); Hemanth Raghav Gajendra, Bangalore (IN); Srinivas Magaji Gundu, Bangalore (IN); Skandan Berikai Kuppan, Bangalore (IN)

(73) Assignee: Hamilton Sundstrand Corporation, Charlotte, NC (US)

( * ) Notice: Subject to any disclaimer, the term of this patent is extended or adjusted under 35 U.S.C. 154(b) by 212 days.

(21) Appl. No.: 18/629,446

(22) Filed: Apr. 8, 2024

(65) Prior Publication Data

US 2025/0183627 A1 Jun. 5, 2025

(30) Foreign Application Priority Data

Dec. 4, 2023 (IN) ............................ 202341082275

(51) Int. Cl.
*H01T 23/00* (2006.01)
*H01T 19/04* (2006.01)

(52) U.S. Cl.
CPC ............ *H01T 23/00* (2013.01); *H01T 19/04* (2013.01)

(58) Field of Classification Search
CPC ..... H01T 23/00; H01T 19/04; A61L 2209/16; A61L 9/22
USPC ......................................................... 361/231
See application file for complete search history.

(56) References Cited

U.S. PATENT DOCUMENTS 3,873,835 A * 3/1975 Ignatjev .................. H01T 23/00 361/231
4,096,544 A * 6/1978 Ignatjev .................. H01T 23/00 361/231
5,973,905 A * 10/1999 Shaw ...................... H01T 23/00 361/231

(Continued)

FOREIGN PATENT DOCUMENTS

CN 111740315 A * 10/2020 ............. H02G 13/80
EP 3346560 A1 7/2018

(Continued)

OTHER PUBLICATIONS

Extended European Search Report for European Patent Application No. 24216957.1, dated Apr. 15, 2025, 10 pages.

*Primary Examiner* — Dharti H Patel
(74) *Attorney, Agent, or Firm* — Kinney & Lange, P.A.

(57) ABSTRACT

An ion generator includes a high voltage source, a body defining a central axis, and multiple arms extending from the body. The body has a primary conductive line electrically coupled to the high voltage source, and a first insulating covering surrounding the primary conductive line. Each arm has an emitter array and a secondary conductive line. The emitter array is disposed at a distal end of the arm relative to the body. The secondary conductive line is electrically coupled to the primary conductive line at a proximal end of the arm relative to the body and extends to the emitter array. The arms are distributed about the central axis, such that the orientations of the emitter arrays and the connection of each arm to the central body are distributed helically, spirally, or symmetrically with respect to other arms, relative to the central axis.

20 Claims, 5 Drawing Sheets

(56) References Cited

U.S. PATENT DOCUMENTS

| | | | | |
|---|---|---|---|---|
| 7,787,231 | B2 * | 8/2010 | Yamashita | G11C 5/145 361/220 |
| 7,944,675 | B2 * | 5/2011 | Chang | H01T 23/00 607/81 |
| 8,116,060 | B2 * | 2/2012 | Orihara | H01T 23/00 361/231 |
| 8,885,316 | B2 * | 11/2014 | Sato | H01T 23/00 361/230 |
| 8,890,070 | B2 * | 11/2014 | Fukada | H01T 19/00 250/326 |
| 9,526,216 | B2 * | 12/2016 | Caldeira | A01G 15/00 |
| 9,661,727 | B2 * | 5/2017 | Gefter | H01T 19/00 |
| 9,706,628 | B2 * | 7/2017 | Feng | H01T 19/04 |
| 9,847,623 | B2 * | 12/2017 | Sunshine | H01T 23/00 |
| 9,925,567 | B2 * | 3/2018 | Waddell | B01D 53/32 |
| 10,128,075 | B2 * | 11/2018 | Waddell | H01J 27/022 |
| 10,980,909 | B2 * | 4/2021 | Okano | B60H 3/0071 |
| 11,141,740 | B2 * | 10/2021 | Galbreath | B64D 13/06 |
| 11,283,245 | B2 * | 3/2022 | Waddell | H01T 23/00 |
| 11,491,496 | B1 * | 11/2022 | Galbreath | B64D 13/06 |
| 11,855,418 | B2 * | 12/2023 | Okano | H01T 19/00 |
| 12,220,708 | B2 * | 2/2025 | Bergh | B03C 3/64 |
| 12,337,333 | B2 * | 6/2025 | Zhu | B03C 3/32 |
| 12,415,210 | B2 * | 9/2025 | Gajendra | B08B 13/00 |
| 2002/0071235 | A1 * | 6/2002 | Gorczyca | H01T 23/00 361/231 |
| 2004/0012909 | A1 * | 1/2004 | Gorczyca | H01T 23/00 361/231 |
| 2005/0108889 | A1 * | 5/2005 | Leventhal | A45D 20/122 34/96 |
| 2009/0042502 | A1 * | 2/2009 | Kim | B60H 3/0078 361/231 |
| 2010/0142112 | A1 * | 6/2010 | Fluhrer | A01G 15/00 361/231 |
| 2010/0175391 | A1 * | 7/2010 | Jee | B60H 3/0071 361/231 |
| 2010/0188793 | A1 * | 7/2010 | Uchida | H01T 23/00 361/231 |
| 2012/0154973 | A1 * | 6/2012 | Vaynerman | B03C 3/383 361/231 |
| 2013/0258543 | A1 * | 10/2013 | Suzuki | H01T 23/00 361/231 |
| 2015/0236484 | A1 * | 8/2015 | Chen | H01T 19/04 361/231 |
| 2016/0190772 | A1 * | 6/2016 | Sunshine | H01T 23/00 361/231 |
| 2017/0133189 | A1 * | 5/2017 | Waddell | H01T 23/00 |
| 2021/0197207 | A1 * | 7/2021 | Galbreath | B64D 13/06 |
| 2023/0291183 | A1 * | 9/2023 | Waddell | G21K 5/02 |
| 2023/0345608 | A1 * | 10/2023 | Matsumoto | H01T 19/04 |
| 2025/0183627 | A1 * | 6/2025 | Vasishta | H01T 23/00 |

FOREIGN PATENT DOCUMENTS

| | | | | | |
|---|---|---|---|---|---|
| EP | 3487017 | A1 | | 5/2019 | |
| JP | 2001321661 | A | * | 11/2001 | |
| JP | 2013114921 | A | * | 6/2013 | H01T 23/00 |
| JP | 2014175058 | A | * | 9/2014 | |
| KR | 102429330 | B1 | * | 8/2022 | A61L 9/22 |
| WO | 2013080695 | A1 | | 6/2013 | |
| WO | WO-2014046721 | A1 | * | 3/2014 | H01T 23/00 |

* cited by examiner

ION EMITTER SYSTEM

CROSS-REFERENCE TO RELATED APPLICATION(S)

This application claims the benefit of Indian Provisional Application No. 202341082275 filed Dec. 4, 2023 for "ION EMITTER SYSTEM" by S. J. Vasishta, H. R. Gajendra, S. M. Gundu, and S. B. Kuppan.

BACKGROUND

The present disclosure relates generally to ion generators, and more specifically to systems for air ionization such as for purification, ventilation, and air-conditioning (HVAC) applications. Air ionizers generally operate by supplying a high voltage to ion emitters that include one or more brushes or needles extending into surrounding air. The operation of air ionizers is often power intensive, and gains in power efficiency and space efficiency for are desirable in most air ionizer applications.

SUMMARY

According to an aspect of the present disclosure, an ion generator includes a high voltage source, a central body defining a central axis, and multiple arms extending from the central body. The central body has a primary conductive line electrically coupled to the high voltage source, and a first insulating covering surrounding the primary conductive line. Each arm has an emitter array and a secondary conductive line. The emitter array is disposed at a distal end of the arm relative to the central body. The secondary conductive line is electrically coupled to the primary conductive line at a proximal end of the arm relative to the central body and extends to the emitter array. The arms are distributed about the central axis, such that the orientations of the emitter arrays and the connection of each arm to the central body are distributed helically, spirally, and/or symmetrically with respect to other arms, relative to the central axis.

DETAILED DESCRIPTION

The present disclosure is directed to an ion generator with an array of ion emitters arranged to ionize air across a broad sphere of influence distributed about the array. This arrangement offers improved power and space efficiency over conventional designs, providing a compact form with increased ion output.

Figure 1A:
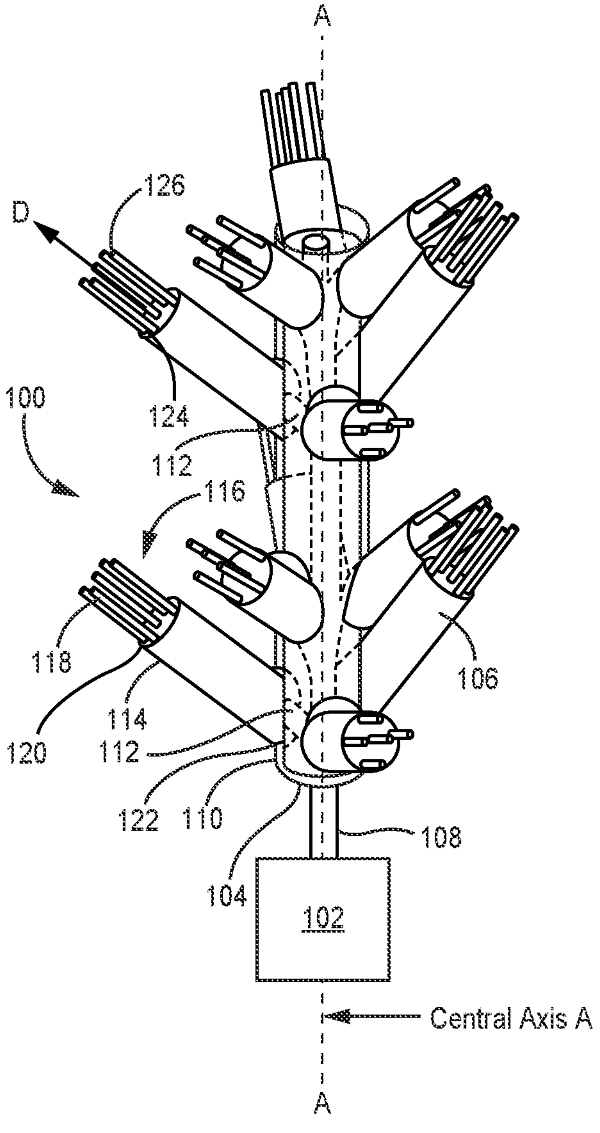
FIG. 1A is a schematic view of an ion generator.
Figure 1B:
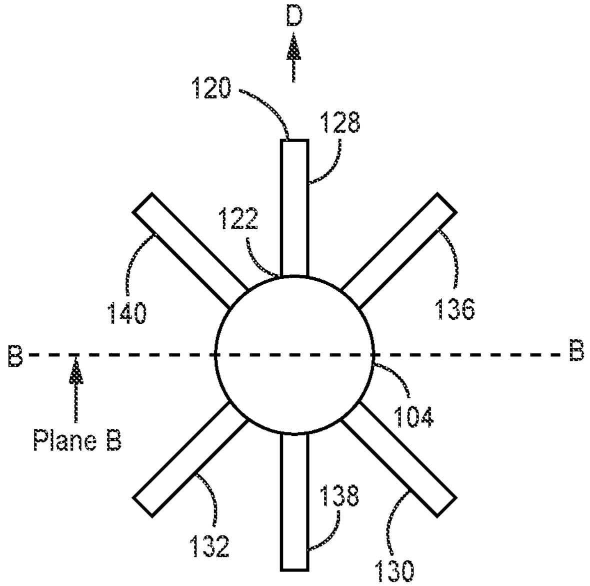
FIG. 1B is a simplified end view of the ion generator of FIG. 1A.
Figure 1C:
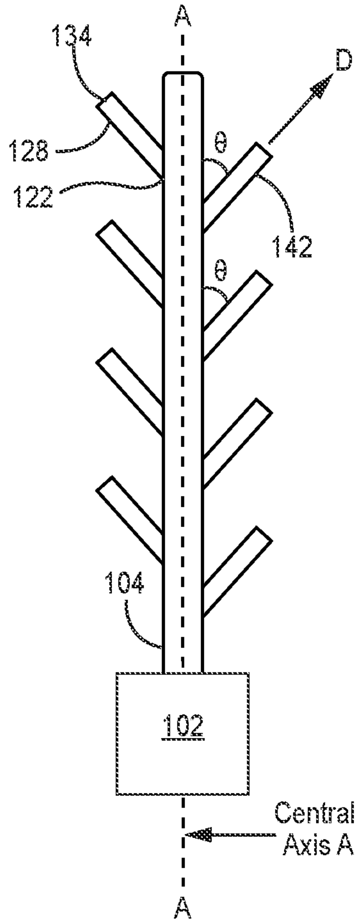
FIG. 1C is a simplified side view of the ion generator of FIG. 1A.

FIG. 1A is a schematic view of ion generator 100. As depicted in FIG. 1A, ion generator 100 is oriented generally along central axis A and includes high voltage source 102, central body 104, and arms 106. Central body 104 includes primary conductive line 108 with first insulating covering 110. In the depicted embodiment, primary conductive line 108 extends principally along central axis A, and first insulating covering 110 surrounds primary conductive line 108 substantially coaxially with central axis A. Each arm 106 extends from a respective proximal end 122 near central axis A to a corresponding distal end 120 relatively remote from central axis A, and includes a secondary conductive line 112 extending generally from its proximal end 122 toward its distal end 120 and surrounded by second insulating covering 114. Each arm 106 includes an emitter array 116 disposed at its distal end 120 and electrically connected to high voltage source 102 via secondary conductive line 112. FIGS. 1B and 1C are simplified end and side views, respectively, of ion generator 100. FIGS. 1A, 1B, and 1C will be discussed together below.

High voltage source 102 provides high voltage electrical energy to central body 104. High voltage source 102 can be any kind of electrical energy source such as a battery, generator, supercapacitor. In some embodiments, high voltage source 102 can be a connection to a remote power source such as a plug or existing electrical grid. High voltage source 102 is electrically connected to central body 104 through primary conductive line 108. Primary conductive line 108 can, for example, be a wire or analogous electrical connector. Primary conductive line 108 is surrounded by first insulating covering 110. First insulating covering 110 provides a physical barrier around primary conductive line 108 and protects primary conductive line 108 from the environment while separating primary conductive line 108 electrically from surrounding components. First insulating covering 110 can be composed of any appropriate insulating material, i.e. with desired durability, rigidity, or other structural characteristics. In ion generator 100, first insulating covering 110 has a cylindrical shape extending along a primary axis aligned along or parallel to central axis A.

Multiple arms 106 are arrayed about central axis A, each extending at least partially radially outward with respect to central axis A, away from primary conductive line 108. Each arm 106 includes a secondary conductive line 112 that connects to primary connective line 108. Multiple secondary conductive lines 112 can connect to primary conductive line 108 within first insulating covering 110. Each secondary conductive line 112 connects primary conductive line 108 to all ion emitters 118 of a corresponding emitter array 116. As described herein, each emitter array 116 consists of cluster of emitters 118 as well as retaining and/or connective structure such as crimping or molding connecting emitters 118 of that emitter array 116 to a respective secondary conductive line 112. Electrical current travels from high voltage source 102 through primary conductive line 108 and the various secondary conductive lines 112 to each emitter 118 on each arm 106. Secondary conductive line 112 can, for example, be surrounded by second insulating covering 114. As illustrated in FIG. 1A, second insulating covering 114 is a sheath or covering analogous to first insulating covering 110 and extending from an outer extent of first insulating covering 110 along and about secondary conductive line 112. Second insulating covering 114 protects and electrically separates secondary conductive line 112 from the surrounding environment. In some embodiments, second insulating covering 114 can be formed separately from first insulating covering 110 and connected to first insulating covering 110 to form an unbroken protective covering surrounding primary and secondary conductive lines 108 and 112, leaving only emitters 118 exposed to the surrounding environment. Alternatively, first and second insulating coverings 110 and 114 can be formed monolithically in place about primary and secondary conductive lines 108 and 112. Primary and secondary conductive lines 108 and 112 can themselves be formed either monolithically together (e.g. via additive manufacturing) or separately, and then joined to form suitable electrical connections (e.g. via welding or soldering).

As noted above, second insulating covering 114 has two ends: distal end 120 and proximal end 122. Second insulating covering 114 connects to first insulating covering 110 at proximal end 122, and terminates at emitter array 116 at distal end 120. Emitter array 116 is connected to distal end 120 of second insulating covering 114. A portion of each ion emitter 118 is outside of second insulating covering 114. This portion will be referred to as the "external portion" of each ion emitter 118. A second portion, hereafter called the internal portion, of each ion emitter 118 is inside of second insulating covering 114. The internal portion of each ion emitter 118 is electrically connected to secondary conductive line 112 inside second insulating covering 114 such that high voltage energy is provided from secondary conductive line 112 to ion emitter 118. The external portion of each ion emitter 118 has two ends: a proximal end 124 crimped to or otherwise electrically connected to secondary conductive line 112, and a distal end 126 extending out from second insulating covering 114 and exposed to the surrounding environment. When environmental air passes over distal end 126 of ion emitter 118, ion emitter 118 ionizes a portion of air molecules passing by distal end 126 of ion emitter 118. Ion emitter 118 can give uncharged air molecules either a positive charge or a negative charge depending on the intended use and configuration of ion emitter 118.

Ion emitters 118 can take a variety of shapes and orientations without departing from the scope and spirit of the present invention. Ion emitters 118 can, in many embodiments, be formed of graphene or other carbon-based materials to avoid or reduce generation of ozone and other undesirable or regulated byproducts. In some embodiments, each emitter array 116 can consist of a several discrete needle-shaped ion emitters 118, e.g. using needlepoint bipolar ionization (NPBI) technology, grouped together with parallel or nearly-parallel orientation. In other embodiments, each emitter array 116 can consist of a brush of an appropriate conductive material, such as a carbon brush. Ion emitters 118 are preferably non-corrosive, highly conductive, inexpensive, easy to fabricate at scale, and maintainable during continuous operation.

Each emitter array 116 is disposed at an orientation away from central axis A. As discussed in greater detail below, emitter arrays 116 can be arranged in a variety of relative orientations extending into the environment surrounding ion emitter 100. Each emitter array 116 can be oriented generally in a respective direction D, with individual ion emitters 118 in a particular array 116 being aligned parallel to or generally with a similar angular orientation (e.g. ±5°) relative to direction D.

Orientations of emitter arrays 116 on arms 106 and of arms 106 on central body 104 are selected to maximize or increase airflow over the aggregate of ion emitters 118, and thereby maximize ionization as a function of space and electrical power. In FIG. 1A, central axis A defines an axis parallel to or coincident with central body 104 such that central body 104 is symmetrical about central axis A. As illustrated in FIG. 1A, ion generator 100 organizes arms 106 into multiple rows. Arms 128, 130, and 132 make up first row 134 and arms 136, 138, and 140 make up second row 142. In an alternative embodiment, ion generator 100 can have any number of rows including a single row. In the illustrated embodiment, ion generator 100 has three arms 106 in each row. In an alternative embodiment, any number of arms 106 can be present in each row.

FIG. 1B illustrates the orientation of arms 106 from a simplified end view along a plane B orthogonal to central axis A. The figures of the present application are not drawn to scale, including angles and orientations of arms 106. Along plane B, all arms 106 are circumferentially arranged about central body 104. In order to maximize the amount of space between emitter arrays 116, the arrangement of arms 106 along the plane B has been staggered between rows such that axially adjacent rows along central axis A are mirrored about plane B. For example, arms 128, 130, and 132 are in first row 134 and arms 136, 138, and 140 are in second row 142. Along plane B, each arm 106 is circumferentially arranged equidistant from the arm proximate to its right and left within its row with respect to central body 104. For example, in row 1, arm 128 is equidistant from arm 132 to its left and arm 130 to its right. In row 2, arm 136 is equidistant from arm 140 to its left and arm 138 to its right. In an alternative embodiment, the distance between arms along plane B can vary to accomplish use case specific objectives. In some embodiments, all rows are equidistant from each other. In another embodiment, some rows can be equidistant from each other while other rows are not equidistant from each other, or all rows can have varying distances from each other. FIGS. 1A-1C illustrate arms 106 distributed generally rotationally symmetrically about central axis A. In a more general case, arms 106 can be distributed about central axis A in a regular but asymmetric fashion, e.g. as a spiraling or helical distribution as a function of axial position. In the illustrated embodiment, arms of each row can for example be evenly angularly distributed (i.e. separated by 120°, in the example case of each row including 3 arms 106), with adjacent rows correspondingly angularly offset (i.e. by 60°). Both the orientations of arms 106 and the connections or interfaces of arms 106 to central body 104 can be rotationally symmetric, spiraling, or helical in orientation relative to central axis A.

FIG. 1C highlights the relative position of each row of arms along central axis A. In FIG. 1C, one arm is shown to represent the relative axial position of all members of a row of arms 106 along central axis A. For simplicity of illustration and explanation, FIG. 1C omits all arms 106 that fall outside of plane B. Consequently, only one arm for each row is shown in FIG. 1C. Ion generator 100 can, as shown in FIGS. 1A and 1B, have three arms in each row, such that only ⅓ of the arms present in ion generator 100 are shown in FIG. 1C. In addition to the rows being staggered axially as is shown in FIG. 1C, the arms are angled with respect to central body 104. In ion generator 100, all arms are angled such that the alignment of the arm forms an angle theta (θ) relative to central axis A. Theta can be any desired angle. In some embodiments some arms may be aligned to form theta relative to central axis A, while other arms form a different angle relative to central axis A. In another embodiment each arm may form a different angle relative to central axis A. As noted above, emitter arrays 116 are located at distal end 120 of each arm 106. In FIG. 1A, each emitter 118 in emitter array 116 on each arm 106 is shown to extend generally parallel to or at a shallow angle (e.g. ±5°, as noted above) with respect to respective direction D defining the orientation of respective arm 106.

Figure 2:
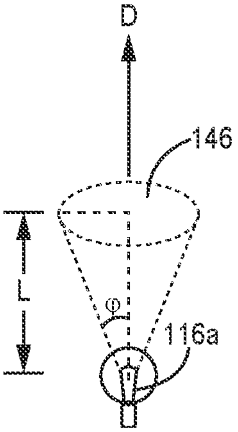
FIG. 2 is a schematic view of a brush orientation for emitters of an ion generator.
Figure 3:
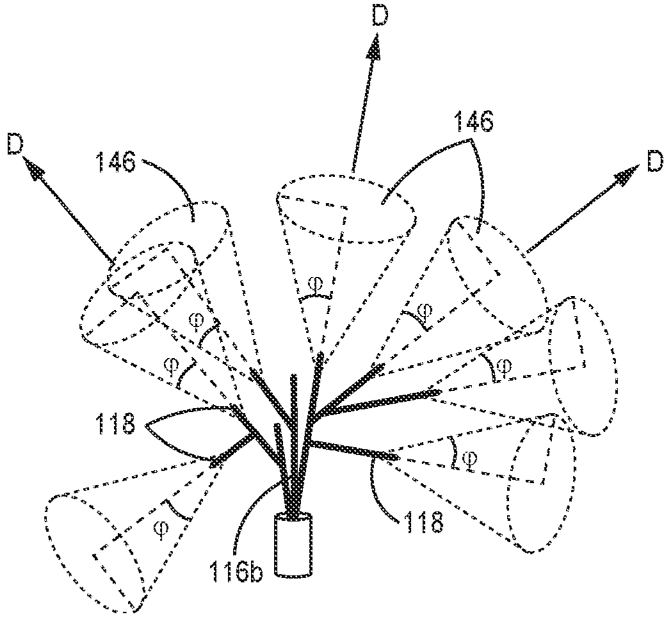
FIG. 3 is a schematic view of distributed orientations of multiple ion emitters of an ion generator.

FIGS. 2 and 3 illustrate exaggerated embodiments of emitter arrays 116 with different distributions of ion emitters 118. FIG. 2 depicts a single exemplary emitter array 116*a* with a brush of emitters 118 to illustrate a zone of influence 146. Zone of influence 146 represents a three dimensional region—substantially a cone—wherein emitters 118 of emitter array 116 are most effective at ionizing environmental air. Ion concentration from emitters 118 of emitter array 116 is reduced outside of zone of influence 146. In the illustrated embodiment, emitter array 116 is oriented in direction D, and zone of influence 146 is depicted as a cone oriented in direction D and defined by length L and an angle (p. FIG. 2 illustrates an embodiment of emitter array 116 (116*a*) having ion emitters 118 disposed in a brush with proximate end 124 and distal end 126 of individual ion emitters 118 close together. FIG. 3 illustrates an exaggerated embodiment of emitter array 116 (116*b*) wherein distal ends of emitters 118 vary widely in terms of location and orientation. FIG. 2 can, for example, represent an emitter array 116*a* consisting of a relatively tightly packed brush of ion emitters 118, while FIG. 3 represents an emitter array 116*b* with longer or more loosely packed ion emitters 118. Embodiments of ion generator 100 as described in FIGS. 1A-1C, and analogously as described below with respect to FIG. 4, can make use of emitter arrays 116 of loosely (FIG. 3) or tightly (FIG. 2) packed distributions of emitters 118, or any combination thereof.

Over time, dust can accumulate on emitter arrays 116. As the amount of dust proximate each ion emitter 118 increases, airflow across emitters 118 is correspondingly reduced, diminishing the efficiency of ion generation. By distributing zones of influence 146 of emitters 118 across a large proportion of environmental volume surrounding central body 104, the structure of ion generator 100 discourages dust accumulation on emitters 118 and thereby promotes efficiency ionization and reduces need for (or frequency of need for) cleaning to remove accumulated dust.

Figure 4A:
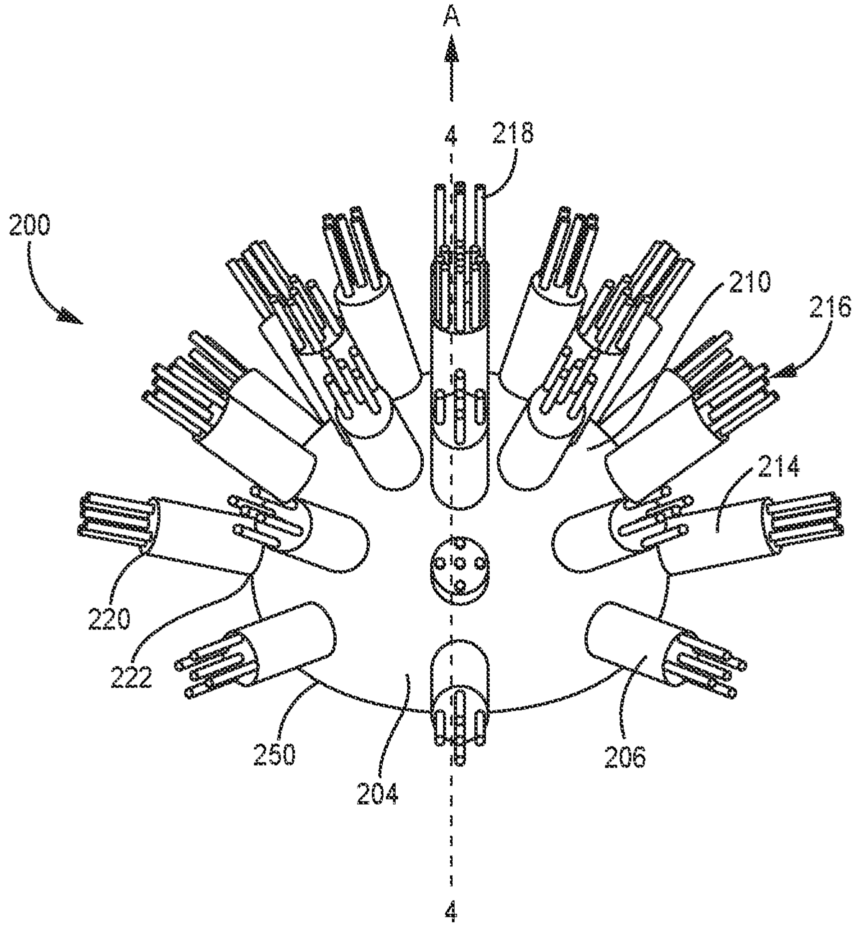
FIG. 4*a* provides a perspective view of an alternative ion generator.
Figure 4B:
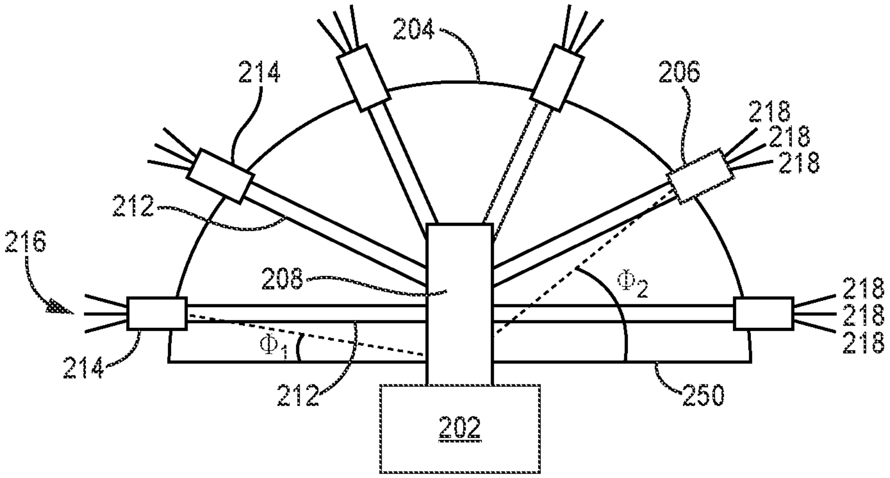
FIG. 4*b* provides a cross-sectional view of the ion generator of FIG. 4*a* through section plane 4-4.

FIGS. 4A and 4B illustrate alternative ion generator 200. FIG. 4*a* provides a perspective view of ion generator 200, while FIG. 4*b* provides a cross-sectional view of ion generator 200 through section plane 4-4. FIG. 4*a* illustrates section plane 4-4, and FIGS. 4*a* and 4*b* are described together. Ion generator 200 operates generally as described above with respect to FIGS. 1A-1C, with components numbered correspondingly (i.e. components 2xx corresponding generally to components 1xx of ion generator 100), but with differing geometry as described below. Ion generator 200 consists of high voltage source 202, body 204, and multiple arms 206. Body 204 includes first insulating covering 210 (surrounding primary conductive line 208 (see FIG. 4B) and base 250. Each arm 206 includes a respective secondary conductive line 212 (see FIG. 4B) with second insulating covering 214, emitter array 216, distal end 220, and proximal end 222.

In FIG. 4*a*, central body 204 is partial spheroid, and arms 206 are distributed in a corresponding geometry about central axis A across an outer surface of central body 204. In the illustrated embodiment, proximal ends 222 of each arm 206 can extend orthogonally from an outer surface of body 204. Arms 206 of ion generator 200 can be arranged in stacked circular rows such that each arm in a row forms the same angle relative to the plane formed by base 250. As illustrated in FIG. 4B, first row angle $\Phi_1$ defines a bottommost row, second row angle $\Phi_2$ defines an adjacent row, and so on. Arms 206 within a particular row can, for example, be distributed evenly about a circumference of body 204 in a cross-sectional plane defined by this respective row angle (i.e. orthogonal to central axis A), e.g. such that all arms of a row are arranged with an angular separation of 360°/N between adjacent arms, with N being the number of arms in a given row. In the illustrated embodiment of FIG. 4A, N=8, resulting in a 45° separation between arms. In the illustrated embodiment, all rows have the same number of arms 206, and arms of each row are situated at identical angular positions relative to central axis A. In alternative embodiments, however, arms of adjacent rows can be located at positions on body 204 that are angularly offset (i.e. rotated) relative to one another. In some embodiments a number of arms per row or a number of emitters 218 per arm may be non-uniform between rows, e.g. with rows having narrower circumference having fewer emitters 218 per arm, or fewer arms 206 per row.

Second insulating covering 214 can vary in size and shape. In one embodiment, ion generator 200 has no second insulating covering 214 distinct from first insulating covering 210, and emitter array 216 extends directly from an outer curved surface of body 204. In this embodiment, secondary conductive line 212 is situated completely within first insulating covering 210, and each secondary conductive line 212 interfaces within emitter array 216 at first insulating covering 210 such that emitter array connects directly to first insulating covering 210 and is exposed to the surrounding environment. In another embodiment, secondary conductive lines 212 can radially beyond an outer extent of body 204, with second insulating coverings 214 extending from first insulating covering 210 to each emitter array 216. Ion generator 200 can have any number of emitter arrays 216 or ion emitters 218, and ion emitters 218 can have varying sizes. The orientation of arms 206 and ion emitters 218 in ion generator 200 maximize airflow over emitter arrays 216, leading to increased ionization rate and emission volume. In FIGS. 4A and 4B, ion concentration can be evenly distributed around ion generator 200 spherically.

Additional arms 106 can be added to ion generator 100 or 200 by using crimps or connectors to increase the number of ion emitters 118 present in a configuration. In some embodiments, some or all such crimping or other connective structure can be captured within or otherwise surrounded by second insulating covering 214. Although cylindrical and hemispherical shapes are shown for the body of ion generator 100 and ion generator 200, respectively, other geometries with locations and orientations of arms 106/206 distributed about a central axis A are also contemplated herein. By providing multiple arms at diverse orientations, ion generators according to this disclosure encompass a greater proportion of surrounding space in the zone of influence of emitters 118/218, thereby promoting increased ionization efficiency and reducing dust accumulation on or near emitters 118/218.

Discussion of Possible Embodiments

The following are non-exclusive descriptions of possible embodiments of the present invention.

An ion generator comprising: a high voltage source; a central body defining a central axis, the central body comprising: a primary conductive line electrically coupled to the high voltage source; and a first insulating covering surrounding the primary conductive line; and a plurality of arms extending from the central body, each arm in the plurality of arms comprising: an emitter array disposed at a distal end of the arm, relative to the central body; and a secondary conductive line electrically coupled to the primary conductive line at a proximal end of the arm, relative to the conductive body, and extending through the first insulating covering to the emitter array, wherein the plurality of arms is distributed about the central axis, such that: orientations of the emitter arrays of each of the plurality of arms relative are helically, spirally, and/or symmetrically distributed with respect to others of the plurality of arms, relative to the central axis; and connection of each of the plurality of arms to the central body are helically, spirally, and/or symmetrically distributed with respect to others of the plurality of arms, relative to the central axis.

The ion generator of the preceding paragraph can optionally include, additionally and/or alternatively, any one or more of the following features, configurations and/or additional components:

A further embodiment of the foregoing ion generator, wherein the central body has a partial spheroid shape.

A further embodiment of the foregoing ion generator, wherein the central body has a cylindrical shape.

A further embodiment of the foregoing ion generator, wherein each emitter array comprises a plurality of emitters arranged in a cluster.

A further embodiment of the foregoing ion generator, wherein all emitters of each emitter array share a common angular orientation with an angular deviation of less than or equal to 5°.

A further embodiment of the foregoing ion generator, wherein each of the plurality of arms further comprises a second insulating covering surrounding the secondary conductive line and extending from the first insulating covering towards the distal end of the arm, but exposing the emitter array.

A further embodiment of the foregoing ion generator, wherein the emitters of each emitter array are electrically connected to the corresponding secondary conductive line via crimping at least partially surrounded by the second insulating covering.

A further embodiment of the foregoing ion generator, wherein the plurality of emitters comprises a brush of carbon bristles.

A further embodiment of the foregoing ion generator, wherein each of the plurality of emitters is a needlepoint bipolar ionization (NBPI) needle.

A further embodiment of the foregoing ion generator, wherein NBPI needles of each emitter array are parallel to each other.

A further embodiment of the foregoing ion generator, wherein all of the plurality of arms are distributed about the central axis such that the plurality of arms forms rows, with a first arm of a first row having a parallel orientation to a second arm of a second row.

A further embodiment of the foregoing ion generator, wherein the plurality of arms further comprises a third row disposed between and adjacent the first and second rows, wherein no arms of the third row are parallel to any arms of the first and second rows.

A further embodiment of the foregoing ion generator, wherein the secondary conductive line is fully encapsulated within the central body.

A further embodiment of the foregoing ion generator, wherein each of the emitter arrays extends substantially orthogonally from an outer surface of the central body.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An ion generator comprising:
- a high voltage source;
- a central body defining a central axis, the central body comprising:
  - a primary conductive line electrically coupled to the high voltage source; and
  - a first insulating covering surrounding the primary conductive line; and
- a plurality of arms extending from the central body, each arm in the plurality of arms comprising:
  - an emitter array disposed at a distal end of the arm, relative to the central body; and
  - a secondary conductive line electrically coupled to the primary conductive line at a proximal end of the arm, relative to the conductive body, and extending through the first insulating covering to the emitter array,
- wherein the plurality of arms is distributed about the central axis, such that:
  - orientations of the emitter arrays of each of the plurality of arms relative are helically, spirally, and/or symmetrically distributed with respect to others of the plurality of arms, relative to the central axis; and
  - connection of each of the plurality of arms to the central body are helically, spirally, and/or symmetrically distributed with respect to others of the plurality of arms, relative to the central axis;
- wherein all of the plurality of arms are distributed about the central axis such that the plurality of arms forms rows, with a first arm of a first row having a parallel orientation to a second arm of a second row.

2. The ion generator of claim 1, wherein the central body has a partial spheroid shape or a cylindrical shape.

3. The ion generator of claim 1, wherein each emitter array comprises a plurality of emitters arranged in a cluster.

4. The ion generator of claim 3, wherein all emitters of each emitter array share a common angular orientation with an angular deviation of less than or equal to 5°.

5. The ion generator of claim 3, wherein each of the plurality of arms further comprises a second insulating covering surrounding the secondary conductive line and extending from the first insulating covering towards the distal end of the arm, but exposing the emitter array.

6. The ion generator of claim 5, wherein the emitters of each emitter array are electrically connected to the corresponding secondary conductive line via crimping at least partially surrounded by the second insulating covering.

7. The ion generator of claim 3, wherein the plurality of emitters comprises a brush of carbon bristles.

8. The ion generator of claim 3, wherein each of the plurality of emitters is a needlepoint bipolar ionization (NBPI) needle.

9. The ion generator of claim 8, wherein NBPI needles of each emitter array are parallel to each other.

10. The ion generator of claim 1, wherein the plurality of arms further comprises a third row disposed between and adjacent the first and second rows, wherein no arms of the third row are parallel to any arms of the first and second rows.

11. An ion generator comprising:

a high voltage source;

a central body defining a central axis, the central body comprising:

a primary conductive line electrically coupled to the high voltage source; and a first insulating covering surrounding the primary conductive line; and a plurality of arms extending from the central body, each arm in the plurality of arms comprising:

an emitter array disposed at a distal end of the arm, relative to the central body; and a secondary conductive line electrically coupled to the primary conductive line at a proximal end of the arm, relative to the conductive body, and extending through the first insulating covering to the emitter array, wherein the secondary conductive line is fully encapsulated within the central body, wherein the plurality of arms is distributed about the central axis, such that:

orientations of the emitter arrays of each of the plurality of arms relative are helically, spirally, and/or symmetrically distributed with respect to others of the plurality of arms, relative to the central axis; and connection of each of the plurality of arms to the central body are helically, spirally, and/or symmetrically distributed with respect to others of the plurality of arms, relative to the central axis.

12. The ion generator of claim 11, wherein each of the emitter arrays extends substantially orthogonally from an outer surface of the central body.

13. The ion generator of claim 11, wherein the central body has a partial spheroid shape or a cylindrical shape.

14. The ion generator of claim 11, wherein each emitter array comprises a plurality of emitters arranged in a cluster.

15. The ion generator of claim 14, wherein all emitters of each emitter array share a common angular orientation with an angular deviation of less than or equal to 5°.

16. The ion generator of claim 14, wherein each of the plurality of arms further comprises a second insulating covering surrounding the secondary conductive line and extending from the first insulating covering towards the distal end of the arm, but exposing the emitter array.

17. The ion generator of claim 16, wherein the emitters of each emitter array are electrically connected to the corresponding secondary conductive line via crimping at least partially surrounded by the second insulating covering.

18. The ion generator of claim 14, wherein the plurality of emitters comprises a brush of carbon bristles.

19. The ion generator of claim 14, wherein each of the plurality of emitters is a needlepoint bipolar ionization (NBPI) needle.

20. The ion generator of claim 19, wherein NBPI needles of each emitter array are parallel to each other.

* * * * *